Patented Dec. 10, 1940

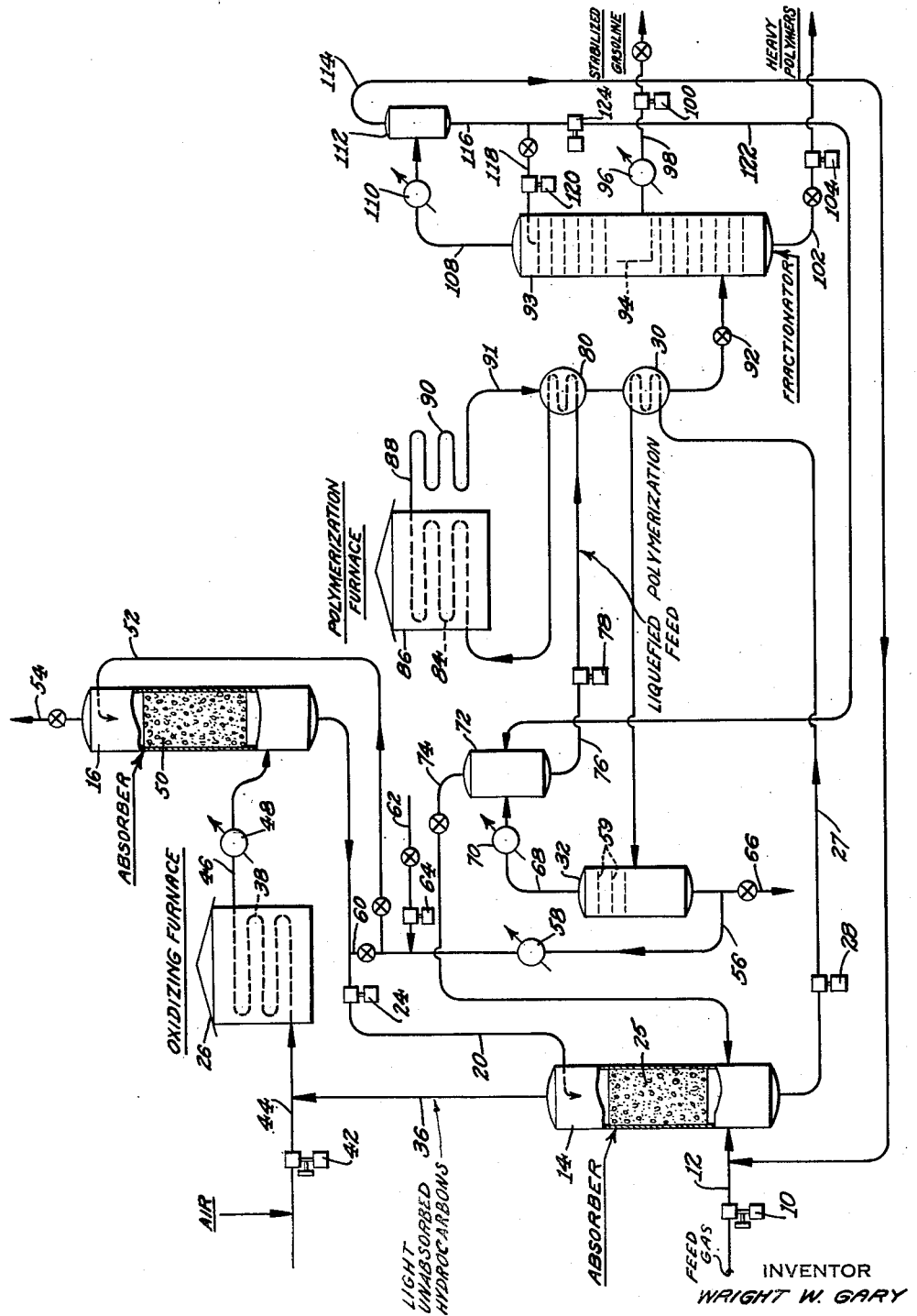

2,224,631

UNITED STATES PATENT OFFICE 2,224,631

TREATING HYDROCARBON FLUIDS

Wright W. Gary, Manhasset, N. Y., assignor to The Polymerization Process Corporation, Jersey City, N. J., a corporation of Delaware Application June 30, 1938, Serial No. 216,787

15 Claims. (Cl. 196—10)

This invention relates to the treatment of hydrocarbons especially gaseous hydrocarbons to produce higher boiling hydrocarbons suitable for use as a motor fuel.

According to my invention hydrocarbon gases preferably containing saturated and unsaturated hydrocarbons are preferably compressed and introduced into an absorber which is designated a secondary absorber because it receives enriched absorber oil from a primary absorber. In addition to the enriched absorber oil some lean absorber oil may be added to the charge going to the secondary absorber. The absorber oil and hydrocarbon gas flow countercurrently and some of the higher boiling or condensible constituents of the hydrocarbon gas are absorbed by the absorber oil.

The vapors and gases leaving the top of the secondary absorber are mixed with a small percentage of an oxygen-containing gas such as air and the mixture is passed through an oxidizing furnace. In this furnace some external heat is supplied but oxidation of the hydrocarbons passing through the heating chamber in the furnace is effected and heat given off and therefore it is not necessary to supply much external heat. During the oxidation, oxygen compounds are formed which act to promote the formation of higher molecular weight hydrocarbon compounds and also promote polymerization of the unsaturated hydrocarbons in a later step in the process. For example, the charge to the oxidizing furnace will contain some ethylene and in the presence of a small amount of oxygen and at an elevated temperature, butylene, propylene and amylenes will be formed in the oxidizing furnace. In addition oxygenated hydrocarbon products will be formed.

The products leaving the oxidizing furnace are introduced into the bottom portion of the primary absorber where they are contacted with lean absorber oil introduced into the top portion of the primary absorber and the absorber oil absorbs hydrocarbons having higher boiling points and oxygenated compounds formed during passage through the oxidizing furnace to partly enrich the absorber oil. The lean absorber oil may be introduced into the primary absorber from an external source, but is preferably recycled through the primary and secondary absorbers.

The enriched absorber oil from the bottom of the secondary absorber is preferably heated and introduced into a separator to separate gases and vapors from liquid. The liquid forms the lean absorber oil which is passed to the absorbers. The vapors and gases are cooled and condensed and passed to an accumulator or separator to further separate vapors and gases from liquid, the vapors and gases being returned to the bottom portion of the secondary absorber for further treatment. The liquid from the accumulator which contains unsaturated hydrocarbons and oxygenated compounds is preferably preheated and passed through a polymerization furnace wherein it is maintained under suitable temperature and pressure conditions to effect the desired polymerization of the low boiling hydrocarbons to form higher boiling hydrocarbons.

The polymerized products are then passed to a stabilizer or fractionator to separate heavy polymers and a stabilized gasoline fraction from vapors and gases. The vapors and gases leaving the top of the fractionating zone are cooled and condensed to separate gases and vapors containing unsaturated hydrocarbon from liquid, the gases and vapors being returned to the bottom portion of the secondary absorber and the liquid or a part of the liquid being returned to the accumulator. Some of the liquid may be returned to the stabilizer as reflux.

In the drawing I have diagrammatically shown one form of apparatus adapted for practicing my invention.

Referring now to the drawing, the reference character 10 designates a compressor for compressing a hydrocarbon gas such as cracking plant gas, natural gas, or the like. The cracking plant gas may be gas obtained from any oil cracking process. Mixtures of gases may be used. The compressed gas is passed through line 12 and is introduced into the bottom portion of an absorber 14 which I will designate as a secondary absorber for the reason that it receives enriched absorber oil from a primary absorber 16. The enriched absorber oil is passed through line 20 by pump 24 into the upper portion of the secondary absorber 14. In addition to the enriched oil, some lean absorber oil may be added as will be described hereinafter. The secondary absorber 14 contains suitable distribution packing 25 for providing large surfaces of contact between the gases and liquid. Instead of the packing 25, bubble trays may be used but I have shown the packing because it is a cheaper construction. The secondary absorber is maintained at a pressure of about 15 to about 400 pounds per square inch, preferably about 350 pounds per square inch.

The compressed gas and introduced absorber oil come into intimate contact as one flows countercurrent to the other and the absorber oil absorbs condensible hydrocarbons including some C₂, C₃ and higher hydrocarbons from the introduced gas. The gases leaving the top of the secondary absorber 14 contain substantially hydrogen, methane, ethane, ethylene and in some cases a small quantity of propane and are partially oxidized in oxidizing furnace 26 as will be described in more detail hereinafter.

The enriched absorber oil is withdrawn from the bottom of the secondary absorber 14 and passed through line 27 by pump 28. The enriched absorber oil is heated by being passed through heat exchanger 30 to vaporize the absorbed constituents from the absorber oil and the heated absorber oil is introduced into the separating drum 32. The separating drum 32 is maintained under a pressure of about 15 to 450 pounds per square inch, preferably about 410 pounds per square inch and a separation into vapors and gases and liquid is effected. The separated liquid is the absorber oil which is introduced into the primary absorber 16 and secondary absorber 14 as will be described in more detail hereinafter.

The gases from the top of the secondary absorber 14 are passed through line 36 and are mixed with a small proportion of oxygen-containing gas. The oxygen-containing gas may be air. If desired, the air may have more oxygen added to it to increase the oxygen content or more inert gas may be added to it in order to reduce the amount of oxygen in the air. However, I prefer to maintain the proportion of diluent gas, nitrogen, low. The amount of oxygen used for oxidizing the gases passing through line 36 is relatively small, the preferred proportion being less than about one-half per cent of oxygen. The oxygen-containing gas is compressed by being passed through compressor 42 and then passed through line 44 and mixed with the gases passing through line 36. The mixture is then passed through the heating zone 38 in the oxidizing furnace 26 where some external heating is supplied. However, there is some oxidation of the hydrocarbons and this oxidation gives off heat which is used to heat the mixture passing through the heating zone 38.

During the oxidation of the gases from the top of the secondary absorber 14, some ethylene oxide is formed which acts as a promoter and assists in the formation of higher olefins such as propylene, butylene and amylene.

In addition oxygenated compounds of the hydrocarbons may be formed as acetaldehyde, formaldehyde, etc. The oxygenated compounds assist in the polymerization step to be later described. The mixture of gases and oxygen-containing gas is maintained under superatmospheric pressure of about 300 to 500 pounds per square inch, preferably about 350 pounds per square inch, during its passage through the heating zone 38 and leaves the heating zone 38 through line 46 at a temperature of about 900 to 1100° F., preferably about 950° F. In the case that gases contain substantial quantities of ethylene, this temperature may be lowered. The reaction products are passed through a cooler 48 and then into the bottom portion of the primary absorber 16 which is maintained under a superatmospheric pressure of about 15 to 400 pounds per square inch, preferably about 325 pounds per square inch. The primary absorber 16 is provided with distribution material 50 for providing good contact between the introduced gases and vapors and the lean absorber oil which is introduced into the top portion of the primary absorber through line 52.

The lean absorber oil absorbs condensible constituents including the higher olefins and oxygenated hydrocarbon compounds from the reaction products and the enriched absorber oil is withdrawn from the bottom of the primary absorber 16 and passed through line 20 to the upper portion of the secondary absorber 14 as has been previously described. The gases which are not absorbed by the absorber oil leave the top of the primary absorber through line 54 and are passed to gas storage or otherwise suitably disposed of. The gases leaving the top of the primary absorber 16 consist essentially of fixed gases such as methane and hydrogen and combustion products which are removed from the system.

The lean absorber oil which is introduced into the upper portion of the primary absorber 16 is withdrawn from the bottom of the separating drum 32 and passed through line 56 and cooler 58 in order to reduce the temperature of the absorber oil. The separating drum may be provided with stripping plates 59. The lean absorber oil is then passed through line 52 into the upper portion of the primary absorber and no absorber oil is passed through line 60. Or a portion of the lean absorber oil may be passed through line 52 and the rest through line 60 to be combined with the absorber oil passing through line 20. When the operation is begun or when it is desired to add absorber oil to the system, absorber oil from an external source can be introduced through line 62 by pump 64 and passed through lines 52 and 60, or passed only through line 52. Lean absorber oil may be withdrawn through valved line 66.

The separation of the oxygenated hydrocarbon products and unsaturated hydrocarbons and polymerization of the unsaturated hydrocarbons will now be described. The gases and vapors separated from the lean absorber oil in the separating drum 32 leave the top thereof and are passed through line 68, through cooler 70 and then introduced into the accumulator or separator 72. After cooling the gases and vapors in the cooler 70, the condensed constituents are separated from the vapors and gases and collected in the accumulator 72. The vapors and gases separated in the accumulator 72 pass overhead through line 74 and are preferably introduced into the bottom portion of the secondary absorber 14 for further treatment. The accumulator is maintained under a pressure of about 15 to 450 pounds per square inch, preferably about 400 pounds per square inch. The liquid which collects in the accumulator 72 contains liquefied unsaturated hydrocarbon constituents which form the charge to be polymerized together with oxygenated hydrocarbon which assist in the polymerization of the unsaturated hydrocarbons.

The liquid is withdrawn from the bottom of the accumulator 72 and is passed through line 76 by pump 78 and is then preheated by indirect heat exchange in heat exchanger 80 where it receives heat from polymerized products leaving the polymerization zone 84. The preheated unsaturated hydrocarbon compounds and oxygenated hydrocarbon products are then passed through the polymerization zone 84 in the polymerization furnace 86 wherein they are maintained under a superatmospheric pressure of about 400 to 3000 pounds per square inch and at a temperature of about 700 to 1100° F. to effect the desired polymerization. During polymerization higher boiling hydrocarbons are produced which contain gasoline constituents.

In addition some lower unsaturated hydrocarbons are produced which are separated and recycled to the secondary absorber. The products after passing through the polymerization zone 84 are passed through line 88 and through a soaker 90 to permit further time for polymerization reactions to take place. While I have shown a separate soaker it will be understood that the soaker may be located within the polymerization furnace 86 and may form a continuation of the reaction zone 84. The reaction products from the soaker 90 are then passed through line 91 and heat exchanger 80 which is used to preheat the charge going to the polymerization zone 84, and then passed through heat exchanger 30 which is used to heat the enriched absorber oil withdrawn from the bottom of the secondary absorber 14 in order to vaporize the absorbed constituents from the enriched absorber oil.

The polymerized products after being cooled by passage through the heat exchangers 80 and 30 but still substantially in vapor form are passed through pressure reducing valve 92 and introduced into the bottom portion of a fractionator 93 which is maintained under a superatmospheric pressure of about 200 to 400 pounds per square inch, preferably, about 375 pounds per square inch. In some cases the pressure reducing valve may be omitted. The fractionator also functions as an evaporator for receiving reaction products from the polymerization zone 84. The polymerized products are fractionated into separate fractions in the fractionator 93, stabilized gasoline or light motor fuel being collected on trap out tray 94 intermediate the ends of stabilizer 93.

The stabilized gasoline is withdrawn from the trap out tray 94, cooled by being passed through a cooler 96 and then passed through line 98 by pump 100 to a suitable storage place. The hot lean absorber oil from the bottom of separator 32 may be used to reboil the liquid collecting on trap out tray 94 in stabilizer 93. Heavy polymers are withdrawn from the bottom of fractionator 93 through line 102 and are passed to storage by pump 104. The gases and vapors remaining after fractionation of the polymerized products in the fractionator 93 leave the top of the fractionator through line 108 and are then passed through a cooler 110 to condense some of the heavier constituents from the vapors.

The cooled and condensed products are introduced into a separator 112 to separate liquid from gases and vapors containing some unsaturated hydrocarbons, the gases and vapors being passed through line 114 and introduced into the bottom portion of the secondary absorber 14 where some unsaturated hydrocarbons are absorbed by the absorber oil and some are passed to the oxidizing furnace 26. The liquid collected in the separator 112 is withdrawn from the bottom thereof through line 116 and a portion of the liquid is passed through line 118 by pump 120 and introduced into the upper portion of the stabilizer 93 as reflux. The remaining liquid is preferably passed through line 122 by pump 124 and is introduced into the accumulator 72 for recycling through the polymerization zone 84. In this way the liquefied material need not be passed through the absorption system.

The products removed from the stabilizer 93, as gasoline and heavy polymers, may be further treated to remove oxygenated compounds by absorption, aqueous or other solution or other suitable means.

While I have shown one form of apparatus and have given one example of a method whereby my invention may be carried out, it is to be understood that changes and modifications may be made and different temperatures and pressures selected where different starting products are used for treatment according to my invention, as will be readily apparent to one skilled in the art.

I claim:

1. A process for treating normally gaseous hydrocarbons to produce higher boiling hydrocarbons, which comprises subjecting a mixture of normally gaseous hydrocarbons containing methane, ethane and ethylene to partial oxidation under superatmospheric pressure and at an elevated temperature to form reaction products containing oxygenated compounds and higher molecular weight olefins than ethylene, cooling the reaction products and intimately contacting them with a lean absorber oil under superatmospheric pressure in an absorbing zone to absorb higher boiling hydrocarbons and oxygenated compounds from reaction products to partly enrich the absorber oil, intimately contacting the partially enriched absorber oil in a separate absorbing zone with hydrocarbon gas containing $C_1$, $C_2$ and $C_3$ and higher hydrocarbons to absorb and separate substantially all the higher boiling hydrocarbons and some of the lower boiling hydrocarbons from such hydrocarbon gas to further enrich the absorber oil and leave a gas containing methane, ethane and ethylene, using the last mentioned gas as the charge of normally gaseous hydrocarbons to be subjected to said partial oxidation, heating the last mentioned enriched absorber oil to separate absorbed hydrocarbons and oxygenated hydrocarbon products from lean absorber oil, recycling the lean absorber oil to the absorbing zones, passing the separated hydrocarbon and oxygenated hydrocarbon products to a polymerization zone wherein they are subjected to such temperature and pressure conditions to effect the desired polymerization, and separating higher boiling hydrocarbons containing gasoline constituents from the polymerization products.

2. A process for treating normally gaseous hydrocarbons to produce higher boiling hydrocarbons, which comprises subjecting a gaseous mixture containing methane, ethane and ethylene to partial oxidation in a confined zone to form reaction products containing oxygenated compounds and higher boiling hydrocarbons, cooling the reaction products and intimately contacting them with a lean absorber oil under superatmospheric pressure to absorb higher boiling hydrocarbons and oxygenated compounds from the reaction products to partly enrich the absorber oil, intimately contacting the partially enriched absorber oil with hydrocarbon gas containing $C_1$, $C_2$ and $C_3$ and higher hydrocarbons to absorb and separate substantially all the higher boiling hydrocarbons and some of the lower boiling hydrocarbons from such hydrocarbon gas to further enrich the absorber oil and leave a gas containing methane, ethane and ethylene, using the last mentioned gas as the gaseous charge to be subjected to said partial oxidation, heating the last mentioned enriched absorber oil to separate absorbed hydrocarbons and oxygenated hydrocarbon products from lean absorber oil, recycling the lean absorber oil to the absorbing steps in the order given, passing the separated hydrocarbons and oxygenated hydrocarbon products to a polymerization zone wherein they are subjected to such temperature and pressure conditions to effect the desired polymerization, and separating higher boiling hydrocarbons from the polymerization products.

3. A process for treating normally gaseous hydrocarbons to produce higher boiling hydrocarbons, which comprises subjecting a mixture of normally gaseous hydrocarbons containing methane, ethane and ethylene to partial oxidation in a confined zone to form reaction products containing oxygenated compounds and higher molecular weight hydrocarbons, cooling the reaction products and intimately contacting them with a lean absorber oil under superatmospheric pressure to absorb substantially all of the higher molecular weight hydrocarbons and oxygenated compounds and some of the lower molecular weight hydrocarbons from the reaction products to partly enrich the absorber oil, intimately contacting the partially enriched absorber oil with hydrocarbon gas containing $C_1$, $C_2$ and $C_3$ and higher hydrocarbons to absorb and separate $C_3$ and higher boiling hydrocarbons from such hydrocarbon gas to further enrich the absorber oil and leave a gas containing methane, ethane and ethylene, using the last mentioned gas as the charge of normally gaseous hydrocarbons to be subjected to said partial oxidation, removing absorbed hydrocarbons and oxygenated hydrocarbon products from the last mentioned enriched absorber oil to separate a lean absorber oil, recycling the lean absorber oil to the absorbing steps, passing the separated hydrocarbons and oxygenated hydrocarbon products to a polymerization zone wherein they are subjected to such temperature and pressure conditions to effect the desired polymerization, and separating higher boiling hydrocarbons from the polymerization products.

4. A process for treating normally gaseous hydrocarbons to produce normally liquid hydrocarbons, which comprises subjecting a mixture of normally gaseous hydrocarbons containing methane, ethane and ethylene to partial oxidation at an elevated temperature to form reaction products containing higher boiling hydrocarbons and oxygenated compounds, cooling the reaction products and intimately contacting them with a lean absorber oil under superatmospheric pressure in a primary absorber to absorb higher boiling hydrocarbons and oxygenated compounds from the reaction products to partly enrich the absorber oil, intimately contacting the partially enriched absorber oil with hydrocarbon gas containing $C_1$, $C_2$ and $C_3$ and higher hydrocarbons under superatmospheric pressure in a secondary absorber to absorb and separate higher boiling hydrocarbons from such hydrocarbon gas to further enrich the absorber oil and leave a gas containing methane, ethane and ethylene, using the last mentioned gas as the charge of normally gaseous hydrocarbons to be subjected to said partial oxidation, heating the last mentioned enriched absorber oil to remove absorbed hydrocarbons and oxygenated hydrocarbon products from lean absorber oil, recycling the lean absorber oil to the primary and secondary absorbers in the order named, passing the separated hydrocarbons and oxygenated hydrocarbon products to a polymerization zone wherein they are subjected to such temperature and pressure conditions to effect the desired polymerization, and separating higher boiling hydrocarbons from the polymerization products.

5. A process for treating normally gaseous hydrocarbons to produce normally liquid hydrocarbons, which comprises subjecting a mixture of normally gaseous hydrocarbons containing methane, ethane and ethylene to partial oxidation at an elevated temperature to form reaction products containing higher boiling hydrocarbons and oxygenated compounds, cooling the reaction products and intimately contacting them with a lean absorber oil under superatmospheric pressure in a primary absorber to absorb higher boiling hydrocarbons and oxygenated compounds from the reaction products to partly enrich the absorber oil, intimately contacting the partially enriched absorber oil with hydrocarbon gas containing $C_1$, $C_2$ and $C_3$ and higher hydrocarbons under superatmospheric pressure in a secondary absorber to absorb the separate higher boiling hydrocarbons from such hydrocarbon gas to further enrich the absorber oil and leave a gas containing methane, ethane and ethylene, using the last mentioned gas as the charge of normally gaseous hydrocarbons to be subjected to said partial oxidation, heating the last mentioned enriched absorber oil to remove absorbed hydrocarbons and oxygenated hydrocarbon products as vapors from lean absorber oil, recycling the lean absorber oil to the primary and secondary absorbers, cooling the vaporized hydrocarbons and oxygenated compounds to separate gases and vapors from liquid constituents, returning the last mentioned gases and vapors to said secondary absorber, passing the separated liquid constituents to a polymerization zone wherein they are subjected to such temperature and pressure conditions to effect the desired polymerization, and separating normally liquid hydrocarbons from the polymerization products.

6. A process for treating normally gaseous hydrocarbons to produce higher boiling hydrocarbons which comprises subjecting a mixture of normally gaseous hydrocarbons containing methane, ethane and ethylene to partial oxidation under superatmospheric pressure and at an elevated temperature to form reaction products containing oxygenated compounds, higher boiling hydrocarbons and higher molecular weight olefins than ethylene, cooling the reaction products and intimately contacting them with a lean absorber oil under superatmospheric pressure to absorb higher boiling hydrocarbons and oxygenated compounds from the reaction products to partly enrich the absorber oil, intimately contacting the partially enriched absorber oil with hydrocarbon gas containing $C_1$, $C_2$ and $C_3$ and higher hydrocarbons to absorb and separate substantially all the higher boiling hydrocarbons and some of the lower boiling hydrocarbons from such hydrocarbon gas to further enrich the absorber oil and leave a gas containing methane, ethane and ethylene, using the last mentioned gas as the charge of normally gaseous hydrocarbons to be subjected to said partial oxidation, heating the last mentioned enriched absorber oil to remove absorbed hydrocarbons and oxygenated hydrocarbon products from lean absorber oil, recycling the lean absorber oil to the absorbing steps, passing the separated hydrocarbons and oxygenated hydrocarbon products to a polymerization zone wherein they are subjected to such temperature and pressure conditions to effect the desired polymerization, and separating normally liquid hydrocarbons suitable as a motor fuel from gases and vapors, cooling the last mentioned gases and vapors to condense and separate heavier liquid constituents from gases, and recycling the liquid constituents through said polymerization zone for further treatment.

7. A process as defined in claim 6 wherein the last mentioned gases are mixed with the hydrocarbon gas containing $C_1$, $C_2$ and $C_3$ and higher hydrocarbons and the gaseous mixture is contacted with the partially enriched absorber oil.

8. A process for treating normally gaseous hydrocarbons to produce higher boiling hydrocarbons which comprises subjecting a mixture of normally gaseous hydrocarbons containing methane, ethane and ethylene to partial oxidation at an elevated temperature to form reaction products containing oxygenated hydrocarbon products and relatively high molecular weight hydrocarbons, cooling the reaction products and intimately contacting them with a lean absorber oil under superatmospheric pressure in a primary absorber to absorb higher boiling hydrocarbons and oxygenated hydrocarbon products to partly enrich the absorber oil, intimately contacting the partially enriched absorber oil with hydrocarbon gas containing $C_1$, $C_2$ and $C_3$ and higher hydrocarbons in a secondary absorber under superatmospheric pressure to absorb and separate substantially all the higher boiling hydrocarbons and some of the lower boiling hydrocarbons from such hydrocarbon gas to further enrich the absorber oil and leave a gas containing methane, ethane and ethylene, using the last mentioned gas as the charge of normally gaseous hydrocarbons to be subjected to said partial oxidation, removing absorbed hydrocarbons and oxygenated hydrocarbon products from the last-mentioned enriched absorber oil to leave a lean absorber oil, recycling the lean absorber oil to the primary absorber, passing the separated hydrocarbons and oxygenated hydrocarbon products to a polymerization zone wherein they are subjected to such temperature and pressure conditions to effect the desired polymerization, and separating normally liquid hydrocarbons suitable as a motor fuel from gases and vapors, cooling the last mentioned gases and vapors to condense and separate heavier liquid constituents from gases, recycling the liquid constituents through said polymerization zone for further treatment, and recycling the last mentioned gases to said secondary absorber for contact with the enriched absorber oil therein to remove higher boiling hydrocarbons from such gases.

9. A process for treating normally gaseous hydrocarbons to produce higher boiling hydrocarbons which comprises partially oxidizing a mixture of normally gaseous hydrocarbons containing methane, ethane and ethylene with less than about ½% of oxygen at an elevated temperature to form reaction products containing oxygenated compounds, higher boiling hydrocarbons, and higher molecular weight olefins than ethylene, cooling the reaction products and intimately contacting them with a lean absorber oil under superatmospheric pressure to absorb higher boiling hydrocarbons and oxygenated compounds to partly enrich the absorber oil, intimately contacting the partially enriched absorber oil with another hydrocarbon gas containing $C_1$, $C_2$ and $C_3$ and higher hydrocarbons to absorb and separate substantially all the higher boiling hydrocarbons and some of the lower boiling hydrocarbons from such hydrocarbon gas to further enrich the absorber oil and leave a gas containing methane, ethane and ethylene, using the last mentioned gas as the charge of normally gaseous hydrocarbons to be subjected to said partial oxidation, heating the last mentioned enriched absorber oil to remove absorbed constituents as vapors and leave a lean absorber oil, recycling at least a portion of the lean absorber oil to each of the absorbing steps, cooling and condensing the constituents and passing them to a polymerization zone wherein they are subjected to such temperature and pressure conditions to effect the desired polymerization, and separating normally liquid hydrocarbons suitable as a motor fuel from gases and vapors, cooling the last mentioned gases and vapors to condense and separate heavier liquid constituents from gases, and recycling the liquid constituents through said polymerization zone for further treatment.

10. A process for treating normally gaseous hydrocarbons to produce higher boiling hydrocarbons which comprises subjecting a mixture of normally gaseous hydrocarbons containing methane, ethane and ethylene to partial oxidation in the presence of less than about ½% of oxygen and at an elevated temperature to form reaction products containing oxygenated compounds and higher molecular weight hydrocarbons, cooling the reaction products and intimately contacting them with a lean absorber oil under superatmospheric pressure in a primary absorber to absorb higher boiling hydrocarbons and oxygenated compounds to partly enrich the absorber oil, intimately contacting the partially enriched absorber oil with another hydrocarbon gas containing $C_1$, $C_2$ and $C_3$ and higher hydrocarbons in a secondary absorber under superatmospheric pressure to absorb and separate substantially all the higher boiling hydrocarbons and some of the lower boiling hydrocarbons from such hydrocarbon gas to further enrich the absorber oil and leave a gas containing methane, ethane and ethylene, using the last mentioned gas as the charge of normally gaseous hydrocarbons to be subjected to said partial oxidation, heating the last mentioned enriched absorber oil to remove absorbed constituents from lean absorber oil, recycling a portion of the lean absorber oil to the primary absorber and another portion to the secondary absorber, passing the separated constituents to a polymerization zone wherein they are subjected to such temperature and pressure conditions to effect the desired polymerization, and separating normally liquid hydrocarbons suitable as a motor fuel from gases and vapors, cooling the last mentioned gases and vapors to condense and separate heavier liquid constituents from gases, and recycling the liquid constituents through said polymerization zone for further treatment.

11. A process of the character described for treating normally gaseous hydrocarbons, which comprises subjecting a gaseous mixture containing methane, ethane and ethylene to partial oxidation at an elevated temperature to form reaction products containing higher boiling hydrocarbons and oxygenated compounds, cooling the reaction products and intimately contacting them with an absorber oil under superatmospheric pressure in an absorbing zone to absorb higher boiling hydrocarbons and oxygenated compounds from the reaction products to partly enrich the absorber oil, intimately contacting the partially enriched absorber oil with hydrocarbon gas containing $C_1$, $C_2$ and $C_3$ and higher hydrocarbons under superatmospheric pressure in a separate absorbing zone to absorb and separate $C_3$ and higher boiling hydrocarbons from such hydrocarbon gas to further enrich the absorber oil and leave a gas containing methane, ethane and ethylene, using the last mentioned gas as the charge of gaseous mixture to be subjected to said partial oxidation, and separating the absorbed hydrocarbons and oxygenated hydrocarbon products from the last mentioned enriched absorber oil to produce a lean absorber oil.

12. A process as defined in claim 11 wherein the lean absorber oil is recycled to the absorbing zones.

13. A process of the character described for treating hydrocarbons which comprises intimately contacting absorber oil with hydrocarbon gas containing $C_1$, $C_2$ and $C_3$ and higher hydrocarbons in an absorbing zone under superatmospheric pressure to absorb and separate substantially all the higher boiling hydrocarbons and leave a gas containing methane, ethane and ethylene, partially oxidizing the last mentioned gas at an elevated temperature to form reaction products containing higher molecular weight hydrocarbons and oxygenated hydrocarbon products, cooling the reaction products and intimately contacting them with an absorber oil under superatmospheric pressure in another absorbing zone to absorb higher boiling hydrocarbons and oxygenated hydrocarbon products therefrom and to enrich the oil, using at least part of the last mentioned enriched absorber oil in said first mentioned absorbing zone, and separating higher boiling hydrocarbons and oxygenated hydrocarbon products from the absorber oil leaving said first mentioned absorbing zone.

14. In a process of the character described for treating normally gaseous hydrocarbons, the steps which comprise subjecting a gaseous mixture containing methane, ethane and ethylene to partial oxidation to form reaction products containing higher boiling hydrocarbons and oxygenated compounds, cooling the reaction products and intimately contacting them with an absorber oil under superatmospheric pressure in an absorbing zone to absorb higher boiling hydrocarbons and oxygenated compounds from the reaction products to partially enrich the absorber oil, intimately contacting the partially enriched absorber oil with hydrocarbon gas containing $C_1$, $C_2$ and $C_3$ and higher hydrocarbons under superatmospheric pressure in a separate absorbing zone to absorb and separate $C_3$ and higher boiling hydrocarbons from such hydrocarbon gas and leave a gas containing methane, ethane and ethylene and separating the absorbed hydrocarbons and oxygenated compounds from the last mentioned absorber oil.

15. A process of the character described for treating hydrocarbons which comprises intimately contacting absorber oil with a gaseous mixture containing $C_1$, $C_2$ and $C_3$ and higher hydrocarbons in an absorbing zone under superatmospheric pressure to absorb and separate substantially all the higher boiling hydrocarbons and leave a gas containing methane, ethane and ethylene, partially oxidizing the last mentioned gas at an elevated temperature to form reaction products containing higher molecular weight hydrocarbons and oxygenated hydrocarbon products, cooling the reaction products and intimately contacting them with absorber oil under superatmospheric pressure in a separate absorbing zone to absorb higher boiling hydrocarbons and oxygenated hydrocarbon products therefrom and using the last mentioned absorber oil with its absorbed hydrocarbons and oxygenated hydrocarbons as the absorber oil in said first mentioned absorbing zone.

WRIGHT W. GARY.